United States Patent

Bedi

[11] 4,033,393
[45] July 5, 1977

[54] SELF-LOCKING FASTENER

[75] Inventor: Ram D. Bedi, Southfield, Mich.

[73] Assignee: Eaton Corporation, Cleveland, Ohio

[22] Filed: May 23, 1973

[21] Appl. No.: 362,996

Related U.S. Application Data

[63] Continuation-in-part of Ser. Nos. 121,664, March 8, 1971, Pat. No. 3,818,525, and Ser. No. 191,196, Oct. 21, 1971, abandoned.

[52] U.S. Cl. .................................. 151/14.5; 151/7
[51] Int. Cl.² ..................... F16B 39/01; F16B 39/28
[58] Field of Search ..................... 151/7, 14, 14.5; 117/105.2, 46 FS; 29/196.3

[56] References Cited

UNITED STATES PATENTS

| | | | |
|---|---|---|---|
| 1,137,941 | 5/1915 | Woodward | 151/14 R |
| 1,368,087 | 2/1921 | Woodward | 151/14.5 |
| 2,251,410 | 8/1941 | Koehning et al. | 29/196.3 |
| 2,393,323 | 1/1946 | Hungerford et al. | 151/7 |
| 3,342,626 | 9/1967 | Batchelor et al. | 117/105.2 |
| 3,552,467 | 1/1971 | Bergere | 151/14 R |
| 3,568,746 | 3/1971 | Faroni | 151/7 |

*Primary Examiner*—Roy D. Frazier
*Attorney, Agent, or Firm*—Teagno & Toddy

[57] ABSTRACT

Reusable self-locking fasteners, and methods of metal fasteners wherein the self-locking characteristic is derived from a patch comprising a metal or metal alloy selectively applied to the threaded surface of the metal fastener in a spraying operation. The metallic patch may comprise a single metal or metal alloy or a composite of metals or metal alloys selectively bonded to the threaded surface of the metal fastener by single or multiple molten spraying operations respectively.

19 Claims, 11 Drawing Figures

SELF-LOCKING FASTENER

CROSS-REFERENCE TO RELATED APPLICATIONS

This application is a continuation-in-part of copending applications U.S. Ser. No. 121,664 filed Mar. 8, 1971 entitled "Self-Locking Fastener" now U.S. Pat. No. 3,818,525 issued June 25, 1974 and U.S. Ser. No. 191,196 filed Oct. 21, 1971 entitled "Composite now abandoned Self-Locking Fastener."

BACKGROUND OF THE INVENTION FIELD OF THE INVENTION

This invention relates to reusable self-locking fasteners and in particular relates to metallic threaded fasteners utilizing a metallic patch to provide the locking characteristic.

DESCRIPTION OF THE PRIOR ART

A variety of self-locking threaded fasteners have been utilized in the past. One type of prior art self-locking fastener utilized a plastic patch and the elastic memory of the plastic material to maintain an adequate locking torque over a number of reuses of the fastener. While these plastic patch fasteners have been generally satisfactory in some usage, their usage has been somewhat limited or impaired by the relatively low modulus of elasticity of the plastic patch, causing the patch to provide only a limited locking torque, by their relatively poor performance in high temperature environments or in applications involving the use of certain organic fluids (e.g. solvents), and by the tendency of the plastic patch to cut. In particular, there has been heretofore a long-felt need for an improved self-locking fastener having an improved reusability characteristic, a high locking torque and/or having the ability to perform well at high temperatures, and/or in the presence of organic fluids.

Another type of prior art self-locking fastener involved the use of a plated metallic path harder than at least one of the corresponding threaded members. These types of hard metallic patch fasteners, such as may be seen in Bergere U.S. Pat. No. 3,552,467, operate by deforming at least one of the mating threaded members. While these fasteners are satisfactory for some uses if properly sized and if utilized with an easily deformable member, such as a nut, they will tend to permanently deform or destroy the threaded members if utilized with a relatively undeformable member such as a threaded engine block or if the patch is oversized.

Another type of prior art self-locking fastener utilized a relatively soft metallic coating on the threaded surface. This type of fastener such as is shown in Woodward U.S. Pat. No. 1,368,087 tended to provide relatively low locking torque and also tended to be relatively poor for repeated applications as the coating would tend to simply extrude after the first on-off cycle.

In summary, of all of the prior art known to applicant, none provides a self-locking fastener which is capable of reuse without losing its locking characteristics and which is substantially non-destructive to the threaded members and has the ability to perform well at high temperatures and/or in the presence of organic fluids. The need for such an improved self-locking fastener is obvious and the present invention is directed to the provision of such a fastener.

SUMMARY OF THE INVENTION

In accordance with the present invention the drawbacks of the prior art have been overcome to the extent that a reusable self-locking fastener is provided which is capable of relatively high locking torques, is usable in relatively high temperatures and in organic fluid environments and is non-destructive to the mating threaded members with which it is associated.

The above is provided by applying to a threaded surface a spongy porous metallic patch which is of lower modulus of elasticity than the corresponding threaded members and substantially fills the troughs between the thread crests. Preferably the patch effectively extends circumferentially less than 180° and more than 90° but in any event, effectively less than 360° to interfere with the mating threaded member and to be substantially resiliently compressed between the two to force the threads into locking contact at a point substantially diametrically opposed the patch. The porosity and spongy nature of the patch allows the patch to deform resiliently, or within its elastic limits, and also to retain lubricants to resist cutting of the patch. Since the patch on engagement of the mating threads deforms resiliently, on disengagement the patch tends to restore itself to its original dimensions. Accordingly, on reuse, it is again effective to provide a significant locking contact.

Moreover, since the patch fills the thread troughs on the metal fastener on which it is located, a greater thickness of deformable material is provided and thus the unit deformation is lower which tends to assure that the patch will operate within its elastic limits.

Spraying has proven to be a very practical and desirable method of filling the thread troughs to provide the advantages of the present invention rather than simply reproducing the thread shape with greater deposits or bulbs at the crests which is the inherent result of producing a patch by plating. Spraying is also an especially desirable method of producing a reusable self-locking fastener as the resulting patch is quickly applied, requires relatively little or no masking. The sprayed material has excellent adherence to the metallic fastener as the sprayed metal impinges into the receiving surface and also because a sprayed patch has a considerably more spongy and porous nature than a plated patch of similar material. A sprayed patch will also take on an elliptical radial cross-section to assure at least a portion of the patch will be in resilient deformation.

In one embodiment of the present invention, the self-locking characteristic is imparted to a threaded fastener by spraying at least a part of the threaded portion of the fastener with a first molten material to provide a lamina of the first material and thereafter spraying a second molten material, dissimilar to the first material, on the first lamina to produce a composite patch which includes an underlayer of the first material and an overlayer of the second material. The bonding of the composite patch to the fastener is improved for the reason that the first layer is chosen for its bonding qualities to the material of the fastener and the second layer is applied to the first layer at a time when the first layer is receptive to a good bond.

Accordingly, an object of the present invention is to provide a new and improved reusable, self-locking fastener.

A further object of the present invention is to provide a new and improved reusable self-locking fastener which is capable of use in high temperature environments and which does not destroy the member with which it mates.

Another object is to provide an improved, reusable, self-locking fastener having improved resistance to loosening torque on reuse and which is usable in high temperature and organic fluid environments.

A further object of the present invention is to provide an improved, reusable, self-locking threaded fastener having a patch of spongy porous metallic material substantially filling the thread troughs and which is resiliently, or at least substantially resiliently compressible on threaded engagement with a mating member to provide the locking therebetween.

A further object of the present invention is to provide an improved, reusable, self-locking threaded fastener having a patch of spongy porous metallic material softer than the threaded fastener or the intended complementary threaded member substantially filling the thread troughs.

Another object of the present invention is to provide an improved, reusable, self-locking threaded fastener having a sprayed patch of relatively softer spongy porous metallic material substantially filling the thread troughs.

These and other objects, features and advantages of the present invention will become apparent from the following detailed description of the preferred embodiment and accompanying drawings.

DESCRIPTION OF THE PREFERRED EMBODIMENT

Figure 1:
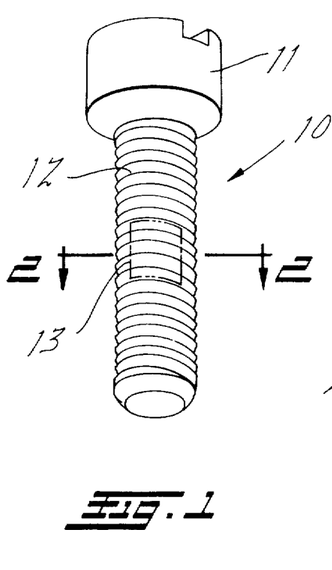
FIG. 1 is a perspective view of a self-locking fastener according to the invention.

With reference to FIG. 1, the disclosed self-locking fastener of the present invention comprises a threaded bolt 10 of standard form having a head portion 11, a threaded shaft portion 12, and a metallic patch 13 provided on a selected area of the threaded surface of shaft portion 12.

Figure 3:
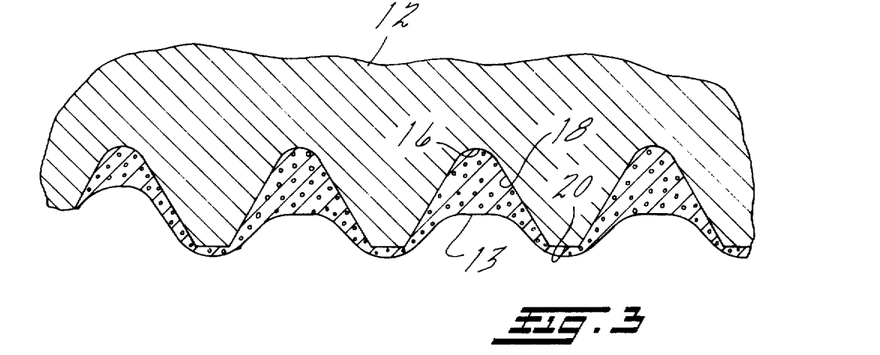
FIG. 3 is an enlarged fragmentary view in longitudinal section taken on line 3—3 of FIG. 2 showing the distribution of a spongy metallic patch material along the threaded surface of the fastener.

As seen in FIG. 3, the metallic patch 13 covers and substantially fills the valleys or thread troughs 16, and may also cover the inclined helical bearing surfaces 18 and the crests 20 of the threaded surface of shaft portion 12. Patch 13 is so located as to be elastically deformed between the threaded surface of shaft portion 12 and mating threads of a complementary element with which the bolt 10 is assembled to provide increased frictional resistance to undesired loosening of the threaded engagement between the bolt 10 and the complementary element.

Figures 8, 11:
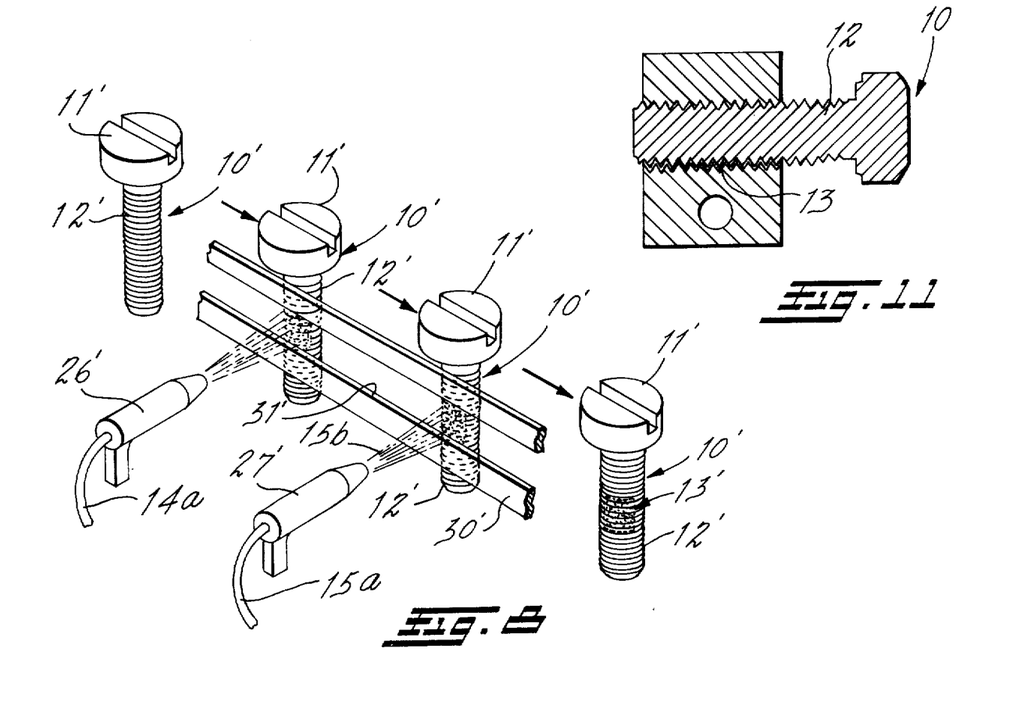
FIG. 8 is a perspective view illustrating a multiple spraying operation for applying a composite metallic patch.
FIG. 11 is a photographic cross-sectional view of a fastener of the present invention in installed, self-locking engagement with a complementary threaded member.

Reference to FIG. 11 will show in greater detail that metallic patch 13 is resiliently deformed between the mating complementary threaded surfaces causing the mating surfaces to be forced into interfering frictional engagement at a point diametrically opposed the patch 13 to retain the threaded members in self-locking engagement.

Figure 2:
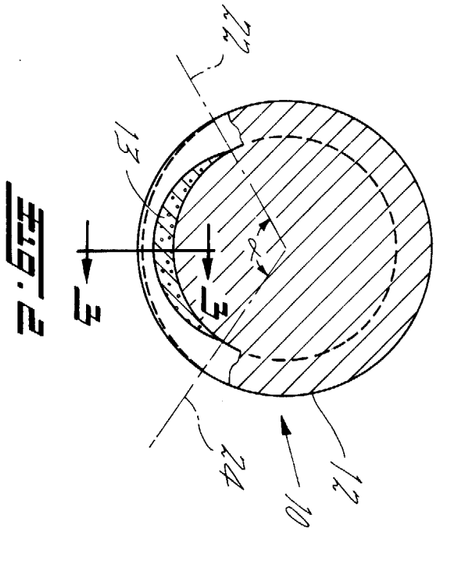
FIG. 2 is a cross-sectional view taken on line 2—2 of FIG. 1.

As best seen in FIG. 2, the effectively exposed surface of the metallic patch 13 extends in a substantially continuous convex curve from one radial plane 22 to another radial plane 24. The included angle $\alpha$ between planes 22 and 24 is preferably greater than 90° and less than 180°.

While it is preferable that the included angle between the planes 22 and 24 be greater than 90° and less than 180°, the angular extent of the patch may vary therefrom. The angular extent of the patch could be in excess of 180° in portions of the patch where the uncovered portions of the threaded member are diametrically opposite the midpoint of the patch. Such a construction could be utilized where a portion of the patch would shear away during the mating of threaded members but yet there would be no detrimental effect of the reusability characteristics of the fastener or the resilient deformation of the patch. In addition, the angular extent of the patch could be less than 90°, in which case a corresponding reduction in locking torque might result.

The radial thickness of the metallic patch 13 is greatest substantially midway between planes 22, 24 and gradually diminishes in radial thickness as it approaches the limiting radial planes so that the exposed surface of the metallic patch 13 forms only a small angle to a tangent to the threaded surfaces at the limiting radial planes. This tapered patch configuration is important since it allows easy engagement of the bolt 10 with a complementary element while yet retaining superior reusability and resistance to undesired loosening of the resulting threaded engagement as the variable radial extension assures at least a portion of the patch will be resiliently elastically deformed. Although the patch is shown to have a generally rectangular configuration, it will be apparent that various other configurational patch shapes may be employed.

In the process of producing the present invention, all or a selected portion of the threaded shaft portion of the fastener may be initially subjected to a pre-treatment including various cleaning steps designed to remove any undesirable contaminants. Specifically, the fastener is first subjected to a brushing operation in which the threaded shaft portion is wire-brushed to remove any loose materials. Thereafter, the fastener is subjected to a solvent cleaning in which the shaft portion is cleaned with trichlorethylene or methyle ketone to remove any soluble oils. The preliminary cleaned fastener thereafter undergoes a grit blasting treatment in which the threaded shaft portion is subjected to grit blasting with between 20 to 50 mesh aluminum oxide for about 3 to 5 seconds. After grit blasting, the fastener is air sprayed to remove any loose grit from the fastener, after which the fastener is preheated with an infrared lamp or other known heating device to about 200° to 220° F to evaporate any moisture from the fastener.

Following this pretreatment of the fastener, a metallic material is applied to the cleaned shaft portion in a spraying operation. The metallic material to be applied in the spraying operation preferably comprises a metal or metal alloy having a modulus of elasticity from $10 \times 10^6$ to $50 \times 10^6$ psi. Particularly satisfactory results have been attained by applying such metallic materials as stainless steel, molybdenum, copper alloys, and carbon steel.

Figure 4:
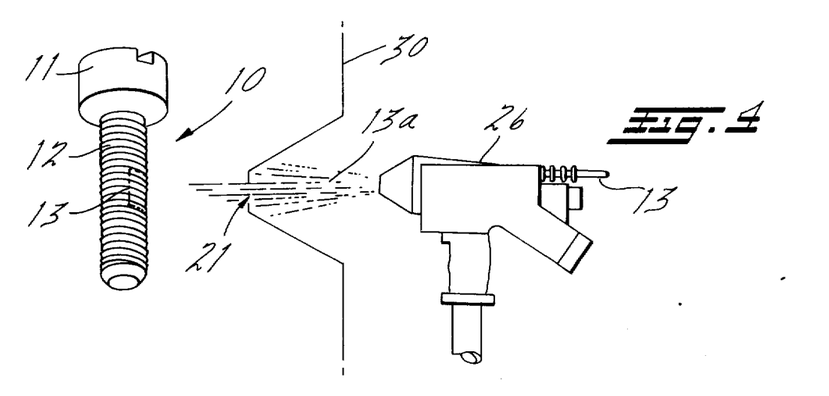
FIG. 4 is a schematic view illustrating a spraying operation for applying the metallic patch material.

As seen in FIG. 4, the spraying equipment includes a flame spray gun 26 (not to scale). Metallic material 13 is fed in wire form through spray gun 26 and is atomized by the gun to produce a metallic spray 13a. A mask 30 is positioned between the fastener 10 and the gun 26; mask 30 includes a central aperture 21 which functions to channel the metallic spray 13a onto a selected arcuate area on the threaded shaft portion 12 of a bolt 10 disposed opposite aperture 21 with its lengthwise axis essentially normal to the spray axis of gun 26. A metallic patch 13 is thus formed on the surface of threaded shaft portion 12 with the arcuate and axial extent of the patch being selectively predetermined by the configuration of opening 21 and the positioning of gun 26 and bolt 10 relative to opening 21. The aforedescribed tapered configuration of the patch produces itself automatically by virtue of the circular shape of the bolt surface and the normal disposition of the bolt axis relative to the spray direction.

Flame spray guns suitable for carrying out the invention process are commercially available, for example, from the Colmonoy Division of the Wall Colmonoy Corporation of Detroit, Michigan. While various Wall Colmonoy spray guns are suitable for the invention process, Colmonoy Wirespray Gun WG-550 has been found to be particularly well suited to the invention process.

The fasteners may also undergo one or more post-treating operations following the spraying operation. For example, the fasteners may be sized to ensure any desired patch thickness or configuration and/or the fasteners may be treated with a light coat of lubricating material such as molybdenum disulfide, SAE-30 oil, or wax.

Although the invention has been described thus far with reference to individual treatment of a single fastener, it will be understood that the invention process actually comprises a production line operation in which a plurality of brushing, cleaning, grit blasting, air spraying, preheating, metal spraying and post-treating work stations are serially arranged in a given work area and fasteners are sequentially moved past the successive stations to achieve mass production of the invention fasteners. For example, bolts 10 may be moved by a suitable conveyer facility successively past gun 26 with the axes of the bolts disposed normal to the spray gun axis and normal to the direction of movement of the bolts.

In order to further illustrate the process of producing the present invention, the following example is provided. It will be understood that this example is provided for illustration purposes only.

EXAMPLE NO. 1

A standard SAE 10-38 steel bolt was first brushed free of loose material by a wire brush, whereafter the bolt was cleaned with trichlorethylene to remove oils. Next, the bolt was grit blasted with 46 mesh aluminum oxide for 3 seconds to remove iron oxides and to pit the threaded surface to provide a roughened surface for bonding. The bolt was then air blasted to remove any loose grit, whereafter the bolt was heated by an infrared lamp to 210° F to evaporate any moisture present. Next, a Colmonoy Wirespray Gun WG-550 was used to apply "Sprabronze C" to the prepared threaded surface. Sprabronze C is a 70% copper, 30% zinc copper alloy, available from Metco Inc. of Westburg, N.Y. The Sprabronze C was applied to the spray gun in wire form and exploded from the spray gun in a semi-molten metallic spray impinging the surface of the fastener and forming a metallic patch bonded to the threaded surface. The mask 30 was placed about one inch from the adjacent surface of fastener threaded shaft portion 12 and the spray gun was held with its tip between 3 to 5 inches from the mask 30. The bolt was sprayed with the Sprabronze C for 5 seconds, forming a continuous metallic patch 13 (FIG. 2) having a 10 to 20 mil thickness measured at the center of the patch and having a spongy, porous constitution by virtue of the spraying operation by which it was formed.

On cooling, the bolt was torque tested using standard steel nuts and the results are listed in the following table. This table also lists torque test results obtained with bolts having different metallic patch materials applied in accordance with the process described above. In each of the following cases, the standard nut was suitably secured, the test fastener was threaded into the nut and the maximum torque (identified in the table as MAXIMUM TORQUE, TIGHTENING) was recorded as the patch traversed the nut, whereafter the fastener was threaded out of the nut and the maximum torque (identified in the table as MAXIMUM TORQUE, LOOSENING) was recorded as the patch retraversed the nut. This completed the first test cycle. Subsequent test cycles followed an identical procedure.

| PATCH MATERIAL | MAXIMUM TORQUE TIGHTENING IN/LBS | MAXIMUM TORQUE LOOSENING IN/LBS | TEST CYCLE |
|---|---|---|---|
| "Sprabronze C" | 90 | 50 | 1st |
| | 65 | 50 | 2nd |
| | 50 | 35 | 3rd |
| | 45 | 30 | 4th |
| Molybdenum | 150 | 105 | 1st |
| (Metco Inc.) | 140 | 125 | 2nd |
| | 125 | 110 | 3rd |
| | 110 | 90 | 4th |
| "Wirespra No. 10" | 95 | 55 | 1st |
| (a carbon steel | 65 | 50 | 2nd |
| available from Wall | 55 | 40 | 3rd |
| Colmonoy) | 40 | 25 | 4th |
| "Bronze A" | 70 | 35 | 1st |
| (a bronze containing | 60 | 35 | 2nd |
| aluminum available | 55 | 35 | 3rd |
| from Wall Colmonoy) | 50 | 30 | 4th |
| "Walcoloy No. 1" | 95 | 65 | 1st |
| (a 18-8 stainless | 55 | 50 | 2nd |
| steel available from | 50 | 45 | 3rd |

-continued

| PATCH MATERIAL | MAXIMUM TORQUE TIGHTENING IN/LBS | MAXIMUM TORQUE LOOSENING IN/LBS | TEST CYCLE |
|---|---|---|---|
| Wall Colmonoy) | 40 | 30 | 4th |

It will be noted that the self-locking fasteners produced by the invention process retain their high resistance to loosening over a period of several use cycles and lose only a small fraction of their resistive ability with each successive cycle.

The self-locking fastener produced by the invention process is also superior to prior art plastic patch fasteners in its ability to retain its self-locking properties even in high temperature environments that would melt plastic patch fasteners and even in the presence of organic fluids that would attack plastic patch fasteners and destroy their retentive ability.

The self-locking fastener of the invention will thus be seen to provide excellent recycle capacity and superior resistance to adverse environmental conditions. The superior performance of the invention fastener in high temperature environments is shown by the following example.

EXAMPLE NO. 2

Two standard ⅜ × 16 steel bolts, one having a Sprabronze C patch material applied by the invention process and the other having a standard nylon insert applied by a commercial supplier, were placed in a furnace and heated to 800° F for 1 hour, whereafter the bolts were removed from the furnace and tested by the torque testing procedure previously described with the following results:

| | MAXIMUM TORQUE TIGHTENING IN/LBS | MAXIMUM TORQUE LOOSENING IN/LBS | TEST CYCLE |
|---|---|---|---|
| Sprabronze C | 150 in/lbs | 140 in/lbs | 1st |
| Patch | 125 | 85 | 2nd |
| | 70 | 60 | 3rd |
| | 70 | 80 | 4th |
| | 70 | 75 | 5th |
| | 60 | 55 | 6th |
| Nylon Insert | 0 | 0 | 1st |

The nylon insert on the nylon insert bolt charred badly during the heating operation and crumbled to a powder when it was passed through the test nut on the first test cycle. The invention bolt continued to provide more than adequate resistance to loosening even after six test cycles.

The ability of the fastener of the present invention to resist high temperatures makes it particularly suitable for such high temperature applications as head bolts for internal combustion engines, and the like.

It is believed the superior performance of the present invention is due in large part to one or more of the following characteristics of the present invention, namely, the patch is metallic, the patch substantially fills the troughs of the thread convolution, the patch is relatively spongy and porous and the patch has a lower modulus of elasticity, or is softer, than the complementary threaded members.

By virtue of the fact that the patch is of a lower modulus of elasticity than the complementary threaded members, the patch will, within limits, deform in preference to either of the complementary threaded members and thus prevent permanent deformation of galling of the threaded members. This is in sharp contrast to fasteners using a relatively hard metallic patch which may permanently deform or gall the threaded members with which it is used.

The resilient nature of the patch, i.e., deformation within elastic limits, allows the patch to provide good locking torque and be reusable. It is believed the relatively spongy and porous nature of the patch 13, which is obtained by spraying, renders the patch considerably more resilient than a less porous patch. On use the patch is resiliently compressed radially on mating engagement of the complementary threaded members. As noted above, the radial compression of the patch causes the threads of the mating members to be forced into a locking engagement at a location substantially diametrically opposed from the patch. When the threaded members are disengaged, the patch tends to restore to its original radial dimension so that on reuse it will again effect locking. Accordingly, the metallic patch, when it is initially deposited on the fastener, has an original radial dimension and it has a lesser radial dimension after it has been compressed due to the mating engagement of the threads. On disengagement of the mating members, that radial dimension tends to restore to its original magnitude as the path resiliently, or substantially resiliently, returns to its uncompressed shape.

Figure 9:
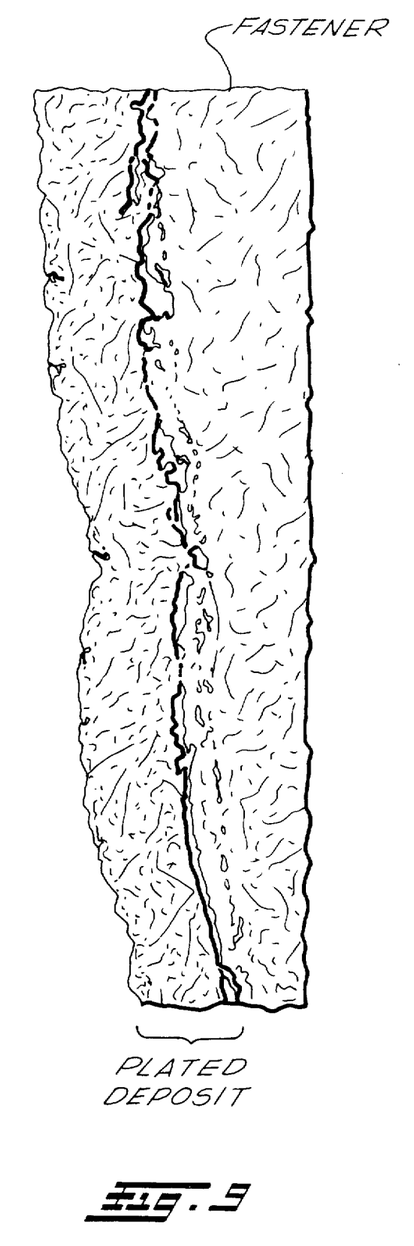
FIG. 9 is a photographic sectional view taken at 250 magnification of a plated patch of 0.007 inch thickness of 70% copper and 30% zinc.
Figure 10:
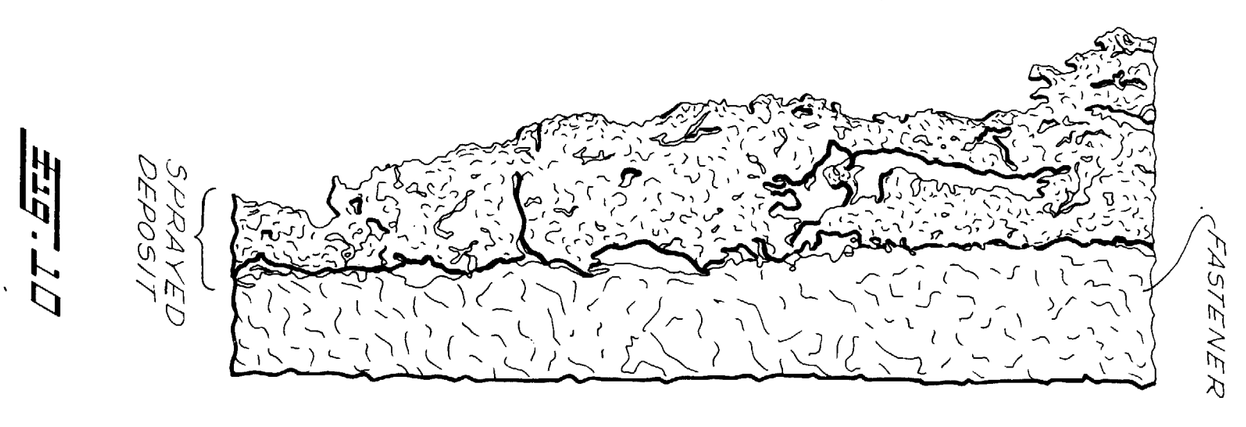
FIG. 10 is a photographic sectional view taken at 250 magnification of a flame sprayed patch of 0.007 inch thickness of 70% copper and 30% zinc.

Reference to FIG. 9 will show a representative 0.007 inch plating of brass comprising 70% copper and 30% zinc at 250 magnification, while reference to FIG. 10 will show a representative 0.007 inch sprayed deposit of brass comprising 70% copper and 30% zinc at 250 magnification. The porous and spongy nature of the spray deposit is obvious from a comparison of these figures. Also, while FIGS. 2, 3, 6 and 7 illustrate the outer surface of the patch as being designated by a line, it should be clear that the outer surface of the patch is not a smooth surface but rather is a porous interrupted surface.

The nature of the patch provides the resilient compressible characteristic which is important to the present invention. Also, it should be noted that the porous nature of the patch results in the patch retaining lubricant, which assists in the patch avoiding cutting during the engagement of the threaded members and thus tends to assure the fact that the patch will be resiliently compressed upon engagement of the threaded members.

Tests of brass comprising 70% copper and 30% zinc as flame sprayed in Example I above, have indicated that the density of the sprayed deposit to be 85 – 87% of the theoretical density of the patch material or that the sprayed deposit is 13–15% porous. Similar tests of plated deposits of brass comprising 70% copper and 30% zinc have yielded an approximately 100% theoretical density or approximately 0% porosity. It is believed that porosity exceeding 5% will be sufficient for the present application. Similar testing of the sprayed brass comprising 70% copper and 30% zinc deposit has indicated an average pore open to the surface will have an extension of 0.007 – 0.010 inch which is believed to be responsible for the sprayed patch having excellent lubricant retention.

By filling the troughs of the thread convolution, applicant has provided a relatively large body of deformable material which will thus be subject to less unit deformation and therefore, be less likely to exceed the limits of elastic deformation. This is especially true where the reusable self-locking fastener is a male threaded member which by design standards has a greater clearance between its troughs and the female thread crests than the female thread troughs have with the male thread crests. Also, by filling the troughs, the troughs tend to support the deformable material while in contrast depositing on the crests, as is inherent with plating, leaves the majority of the deformable material unsupported.

From the above, it should be clear that applicant has provided a substantially improved locking fastener utilizing a metallic patch which is of a spongy porous nature. That patch is made by a spraying technique. Applicant has discovered that plating techniques will not provide an equivalent patch. In fact, not only is the spongy porous nature of the patch substantially absent from a plated patch as shown by a comparison of FIGS. 9 and 10, but also the plating of a threaded fastener results in bulbous portions of material building up on the crests of the threads with relatively little deposit of material in the troughs. As a result, in order to substantially fill the troughs with material, extremely large bulbous plated deposits of metal are formed on the crests which would render the fasteners unusable and impractical.

An alternate embodiment of the present invention may be seen by reference to FIGS. 5–8. The alternate embodiment comprises elements similar to those described above for fastener 10 except they will be referred to by a primed reference numeral. The alternate embodiment will be described in relation to a method for imparting a self-locking characteristic to a threaded metal fastener, and in relation to a reusable threaded metal fastener produced by the method.

Figures 5, 6, 7:
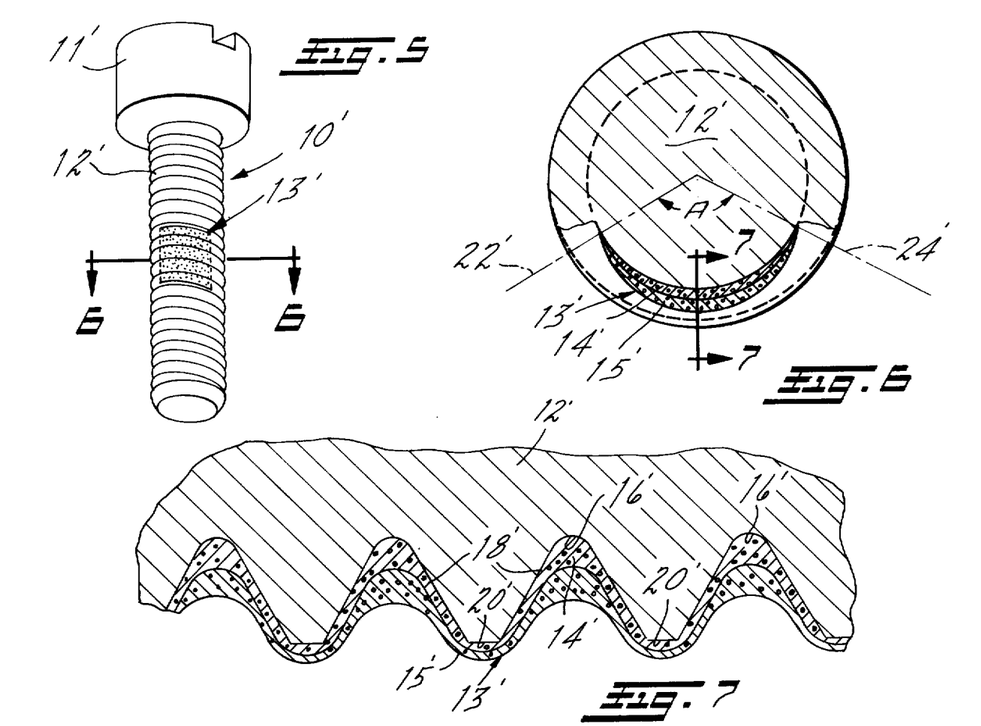
FIG. 5 is a perspective view of an alternate embodiment self-locking metal fastener according to the disclosure.
FIG. 6 is a cross-sectional view taken on line 6—6 of FIG. 5.
FIG. 7 is an enlarged fragmentary view in longitudinal section taken on line 7—7 of FIG. 6 showing the distribution of laminar metallic patch materials along the threaded surface of the fastener.

A reusable self-locking fastener is illustrated in FIG. 5 comprising a threaded bolt 10' of a standard form having a head portion 11', a threaded portion 12', and a composite metallic patch 13' provided on a selected area of threaded portion 12'.

As illustrated in FIG. 7, the composite metallic patch 13' comprises an underlayer of metallic material 14' and an overlayer of metallic material 15', and substantially fills the valleys 16', and may cover the inclined helical bearing surfaces 18' and the crests 20' of a part of threaded portion 12'. Composite patch 13' is located relative to the length of threaded portion 12' so that it will be elastically deformed between the threaded portion 12' and mating threads of a complementary element with which the bolt 10' is assembled to provide increased frictional resistance to undesired loosening of the threaded engagement between bolt 10' and the complementary element. The material 14' of the underlayer is preferably similar to bolt 10'. The material 15' of the overlayer is dissimilar to material 14' and has a lower modulus of elasticity than that of material 14' and the threaded members. Functionally, the patch is identical to patch 13 described above.

In accordance with the method aspects of the present disclosure, all or a selected portion of threaded portion 12' of fastener 10' is initially subjected to a cleaning solvent, such as trichlorethylene or methyl ethyle ketone, to remove any soluble oils. Following cleaning of fastener 10', a first metallic material 14' is applied to the cleaned portion in a first spraying operation. The first metallic material 14' is preferably a metal or metal alloy similar to and which may have a modulus of elasticity substantially the same as that of the material of the threaded portion of the fastener. Satisfactory results have been obtained by applying a metallic material such as carbon steel on a carbon steel fastener.

A second metallic material 15' is thereafter applied to the first metallic material 14' in a second spraying operation to produce a composite metallic patch 13'. The second metallic material that is illustrated is a metal or metal alloy having in its sprayed-on state a modulus of elasticity lower than that of the first metallic material. The resulting patch comprises an underlayer, adjacent the fastener, of the first metallic material, e.g., steel, and an overlayer of the second metallic material, e.g., copper alloy. Satisfactory results have been attained by using materials such as molybdenum and copper alloys for the second metallic material in application where a complementary, threaded, steel element is contemplated. It should be noted that the second material is chosen from a group of materials which have good lubricious properties when engaged with the material of the complementary element and which also have good bonding properties with the first material. In the preferred embodiment the overlayer of the patch should be an elastic material which will deform upon contact with the complementary threads. As has been discussed above, it is preferred to have the patch deform rather than the complementary threads.

As illustrated in FIG. 8, the spraying operation includes two flame spray guns 26' and 27'. Bolts 10' are successively moved past the guns 26' and 27' by a suitable conveyor facility (not shown) with their longitudinal axis disposed normal to the spray from the guns and the direction of movement of the bolts. Metallic material 14a and 15a is fed in wire form through spray guns 26' and 27', respectively, and is atomized by the guns to produce molten metallic sprays 14b and 15b. Spray guns 26' and 27' are positioned so that the molten metallic spray 15b is applied to bolt 10 immediately after the application of the molten metallic spray 14b. By so positioning the guns, the first material will be at a high temperature at the time the second material is applied. Application in this manner results in improved bonding between the materials 14 and 15. A mask 30' is positioned between bolts 10' and guns 26' and 27'. Mask 30' includes a longitudinal central aperture 31' which functions to channel molten metallic sprays 14b and 15b onto the selected arcuate area on threaded portions 12' of bolts 10'. A composite metallic patch 13' is thereby formed on the surface of threaded portion 12' with the arcuate and axial extent of the patch being selectively predetermined by the configuration of opening 31' and the positioning of guns 26' and 27' and bolt 10'. The tapered configuration of patch 13' is produced in the disclosed method by virtue of the circular shape of the sprayed surface and the normal disposition of the bolt axis relative to the direction of the spray.

In order to further illustrate the method and fastener of the alternate embodiment the following example is provided.

EXAMPLE

A standard SAE-10-38 steel bolt was first cleaned with trichlorethylene to remove oils. Next, a Colmonoy Wirespray Gun WG-550 was used to apply a first metallic layer of steel to the threaded surface of the bolt. The steel was fed into the spray gun in wire form and exploded from the spray gun in a molten metallic particle spray which impinged upon the surface of the bolt forming a first layer of heterogeneous, spongy, porous metallic material bonded to the threaded surface. Immediately thereafter, in a similar manner, a second spray gun was used to apply a second metallic material of Sprabronze C over the first metallic layer to produce a composite metallic patch. Sprabronze C is copper alloy consisting of 70% copper and 30% zinc. The alloy is available from Metco Inc. of Westbury, N.Y.

The mask 30' was placed about one inch from the adjacent surface of the bolt's threaded portion 12'. Spray guns 26' and 27' were held with their tips between 3 to 5 inches from mask 30'. The bolt was sprayed with the steel for about 5 seconds, forming a heterogeneous metallic layer (FIG. 6) having a spongy, porous constitution by virtue of the spraying operation. Immediately thereafter the bolt was sprayed with the Sprabronze C for about 2 seconds, forming a second homogeneous spongy, porous metallic layer (FIG. 6).

The composite patch method is particularly attractive as it allows the outer patch to be applied to the fastener without the requirement that the fastener 10' be super heated which might require spraying in an inert atmosphere to avoid undesired oxidation of the super-heated fastener head 11 and body 12.

Although this invention has been described in its preferred forms with a certain degree of particularity, it is understood that the present disclosure of the preferred form has been made only by way of example and that numerous changes in the details of construction and combination of the parts may be resorted to without departing from the spirit and the scope of the invention as hereinafter claimed.

I claim:

1. A reusable self-locking metallic fastener comprising a body and a thread convolution formed on said body about a central axis, said thread convolution being adapted for engagement with a mating thread convolution, said thread convolution on said body including axially spaced thread crests and interposed troughs between the crests, means disposed on said thread convolution on said body for providing an interfering locking engagement with the mating thread convolution to retard relative rotational movement between said thread convolution on said body and the mating thread convolution to effectively lock the thread convolutions together, said means for providing an interfering locking engagement comprising a metallic patch of lower modulus of elasticity than said thread convolutions bonded to said body and extending axially over surfaces defining a plurality of said crests and substantially filling at least one of said troughs, said patch being thicker in said thread troughs than on the adjacent thread crests, said patch having an effective circumferential extension of not more than 180°, said patch extending radially outwardly from said thread convolution on said body to engage said mating thread convolution when said thread convolutions are in threaded engagement at a point axially coincident with said patch, said metallic patch comprising at least one layer of metallic material bonded to said body, said metallic material being substantially resiliently compressible in a radial direction to provide said interfering engagement of said thread convolutions at a point circumferentially opposite said patch.

2. The reusable locking fastener of claim 1 wherein said metallic material is a relatively spongy porous material.

3. The reusable locking fastener of claim 2 wherein said metallic material has a density of less than 95% of its theoretical density.

4. The reusable locking fastener of claim 3 wherein said metallic material has a density of 85 – 87% of its theoretical density.

5. The reusable locking fastener of claim 2 wherein said metallic patch has a cross-sectional area lying in a radial plane, said cross-sectional area being of generally crescent shape to ensure at least a portion of said metallic patch is resiliently compressed between said thread convolutions when said thread convolutions are in locking engagement.

6. The reusable locking fastener of claim 5 wherein said metallic patch is flame sprayed onto said body.

7. The reusable locking fastener of claim 6 wherein said metallic patch has an effective circumferential extension of at least 90°.

8. The reusable locking fastener of claim 7 wherein said metallic patch comprises an inner and an outer layer, said inner layer having a modulus of elasticity of similar to said body and said outer layer having a modulus of elasticity substantially lower than the modulus of elasticity of said body.

9. The reusable locking fastener of claim 7 wherein said thread convolution formed on said body is a male thread.

10. A reusable self-locking fastener capable of high temperature application comprising a body and a thread convolution formed on said body about a central axis, said thread convolution being adapted for engagement with a mating thread convolution, said thread convolution on said body including axially spaced thread crests and interposed troughs between the crests, means disposed on said thead convolution on said body for providing a substantially non-damaging interfering engagement with the mating thread convolution to retard relative rotational movement between said thread convolution on said body and the mating thread convolution to effectively lock the thread convolutions together, said means for providing the interfering engagement comprising a metallic patch bonded to said body and comprising at least one layer of sprayed metallic material having a lower modulus of elasticity than said thread convolutions extending axially over surfaces defining a plurality of said crests and substantially filling at least one of said troughs, said patch being thicker in said thread troughs than on the adjacent thread crests, said patch extending radially outwardly from said thread convolution on said body to engage said mating thread convolution when said thread convolutions are in threaded engagement at a point axially coincident with said patch, said metallic patch effectively extending circumferentially a distance not more than 180° of said thread convolution on said body, said metallic patch being substantially resiliently compressible to provide said interfering locking engagement of said thread convolutions at a point circumferentially opposite said patch when said patch is engaged with said mating thread convolution.

11. The reusable self-locking fastener of claim 10 wherein said metallic patch comprises a first layer of sprayed metallic material readily bondable to said body and a second layer of sprayed metallic material readily bondable to said first layer.

12. The reusable self-locking fastener of claim 11 wherein said second layer comprises a metallic spongy porous layer.

13. The reusable self-locking fastener of claim 12 wherein said second layer has a density of less than 95% theoretical density.

14. The reusable self-locking fastener of claim 13 wherein said second layer has a density of 85% - 87% of theoretical density.

15. The reusable self-locking fastener of claim 13 wherein said patch has an effective circumferential extension of at least 90°.

16. A reusable, self-locking, externally threaded fastener comprising body and a threaded convolution formed on the exterior of said body about a central axis, said thread convolution being adapted for engagement with a mating internal thread convolution, said thread convolution on said body including axially spaced thread crests and interposed troughs between the crests, means disposed on said thread convolution on said body for providing an interfering locking engagement with the mating thread convolution to retard relative rotational movement between said thread convolution on said body and the mating thread convolution to effectively lock the thread convolutions together, said means for providing an interfering engagement comprising a metallic patch of lower modulus of elasticity than said thread convolutions bonded to said body and extending axially over surfaces defining a plurality of said crests and substantially filling at least one of said troughs, said patch being thicker in said thead troughs than on the adjacent thread crests, said patch extending radially outwardly from said thread convolution on said body to engage said mating thread convolution when said thread convolutions are in threaded engagement at a point axially coincident with said patch, said metallic patch having a cross-sectional area lying in a radial plane, said cross-sectional area being of generally crescent shape, said metallic patch comprising at least one layer of metallic material bonded to said body, said patch having a circumferential extension of less than 360°, the uncovered portion of said threaded body being substantially diametrically opposed to the circumferential midpoint of the patch, said metallic material being substantially resiliently compressible in a radial direction to provide said locking engagement of said thread convolutions at a point circumferentially opposite said patch.

17. The reusable locking fastener of claim 16 wherein said patch comprises at least one layer of sprayed metallic material.

18. The reusable locking fastener of claim 16 wherein said material has a density of less than 95% of theoretical density.

19. The reusable locking fastener of claim 18 wherein said patch has a circumferential extension of at least 90°.

* * * * *